July 30, 1963 U. TUCHEL 3,099,506

SHIELDED ELECTRICAL COUPLER

Filed Oct. 24, 1961

INVENTOR
ULRICH TUCHEL
BY
McGlew and Toren
ATTORNEYS

United States Patent Office 3,099,506

Patented July 30, 1963

3,099,506

SHIELDED ELECTRICAL COUPLER

Ulrich Tuchel, Neckartalstrasse 51, Heilbronn (Neckar), Germany

Filed Oct. 24, 1961, Ser. No. 147,265
Claims priority, application Germany Oct. 24, 1960
10 Claims. (Cl. 339—143)

This invention relates in general to electrical connectors or couplers and in particular to a new and useful coupling device for shielded electrical lines employed in high frequency and low frequency systems.

In telecommunication and high frequency systems, it is important in many cases to prevent the spreading or diffusion of electrical or magnetic fields into certain areas in which these fields might exert a disturbing influence. Thus, for example, the interior of conductor conduits should be free from fields of surrounding devices. This is true whether these conduits are employed for transmission of high quality pictures or sound frequencies, or for transmission of regulating characteristics, or adjusting values or the like. In such systems, the space which is occupied by the field or which is to be free from the field is shielded or screened by metallic envelopes.

Electrostatic fields can be substantially successfully screened or shielded by thin metal foils, provided these shields do not have any interrupted areas or gaps. In practical applications, however, due to the face that devices and apparatus are usually detachably connected to one another, great difficulty is experienced in preventing the entry or exit of interfering or disturbing electrical phenomena at the point of entry or exit. For a perfect shielding, it is not sufficient to keep the gaps between the connected areas as narrow as possible. In some instances, it is sufficient to have the abutting areas arranged in an overlapping manner where the overlapping area is made rather wide. This is sufficient in case a magnetic interfering field is situated transversely to or across the separating edges or gaps. In those instances, where the interfering or disturbing field has the same direction as the gap, then the field lines will enter into the space even though the narrowest gap possible is maintained. Such entry of the disturbing field can only be prevented if one succeeds in providing an almost gapless shielding of the critical connecting area and the establishment of good contact connection to the adjacent shielding of the adjacent element. In such an event, the interfering current will be faced with such a large drop in potential that only very small or insignificant field lines can penetrate into the space to be shielded.

The present invention has particular application for coupling shielded electrical lines used predominantly in high frequency and low frequency techniques. Such coupling devices are required both for connecting removable lines with each other and also for connecting movable lines with devices, arrangements or structural elements, whether the latter are stationary or movable.

In connecting lines with which high or low frequency currents are to be transmitted, it is absolutely essential that the conduits for the conductors be made of a construction which precludes any disturbances or interferences. This requirement does not apply only to entering interfering stray currents from the outside from extraneous interfering course, but, at the same time, applies to interfering fields which are caused by the current within the line and which may have a disturbing effect on adjacent arrangements or devices.

With regard to the lines proper, it is possible to counteract such disturbing influences by a suitable static screening or shielding of the connecting lines. For example, this may be accomplished in the form of a single or multiple metal winding, or by means of a twin jacket of the individual connecting lines which are electrically insulated against each other. Much more complicated, however, is the prevention of the entry or exit of disturbing phenomena at the detachable connecting areas of such lines.

In accordance with the invention, a coupling is provided which includes a plurality of nested sleeve elements, successive ones of which are arranged in an offset manner to overlie the detachable points or gap areas, the detachable portions of the coupling being so connected with the coupling sleeve elements that gaps never appear in which disturbing influences may be either emitted or received. The coupling includes a contact element having, for example, the usual narrow or plug pins or female sockets which are surrounded by a shielding at least double on all sides and which extends symmetrically in the direction of the conduit, the shielding being provided by a multiple nesting of the individual coupling elements.

In a preferred construction, the shielding of the cables or the connecting lines in the respective coupling half portions is taken over by a radially disposed crown sleeve which widens conically in the interior space of the coupling. This crown sleeve is pressure-spread into electrical contact with the coupling casing at two separate areas in a concentric manner. The spreading is accomplished by means of a frusto-conical section of a pressure sleeve acting on elastic arms formed on the crown sleeve. To provide for the inter-engagement of the various coupling sleeve elements, there is employed a stepped sleeve construction which permits the inter-engagement thereof. The locking of the complete coupling is accomplished by a central locking ring, which fits over the nested sleeve coupling elements. Due to the nesting or multiple overlapping of the individual portions of the coupling, the connecting elements proper, that is, the front pins or sockets and the wiring space pertaining thereto, are arranged in a coupled condition concentrically surrounded in practically a gap-less manner by shielding which is of double construction on all sides and permits no disturbing electrical leakages. Such shielding merging directly in the line of the shielding prevents undesired penetration of stray fields, the exit of the fields caused by the conducted current.

Accordingly, it is an object of the invention to provide an improved electrical connector.

A further object of the invention is to provide an electrical connector including a plurality of nested sleeve shielding elements wherein shielding sleeve portions are arranged to overlap each of the connecting gaps of the coupler.

A further object of the invention is to provide an electrical connector for a contact element body including a crown sleeve element adapted to be pressure connected to the contact portion of the contact element body and having a space therein for the connection of cables and including a plurality of coupling sleeve elements disposed around said crown sleeve, said coupling sleeve elements being telescopically disengageable and having means for anchoring them together, wherein the sleeve elements are arranged so that the disengageable areas are overlapped with shielding layers formed by the adjacent coupling elements.

A further object of the invention is to provide a coupling construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
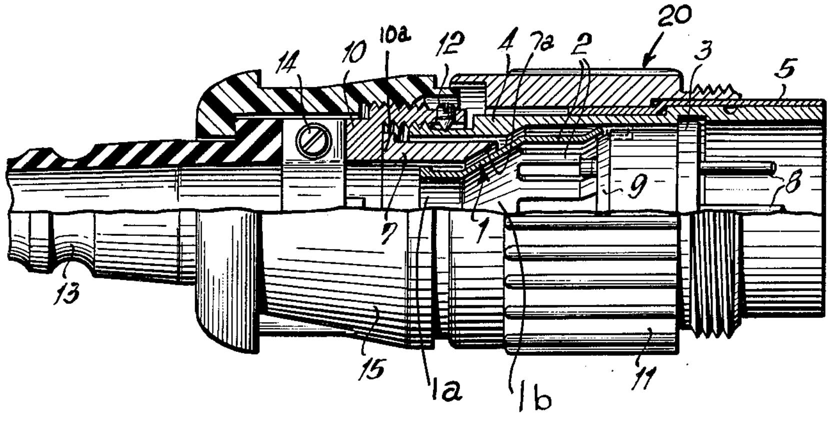
FIG. 1 is a partial section and partial elevation through a pin portion of a coupling constructed in accordance with the invention.
Figure 2:
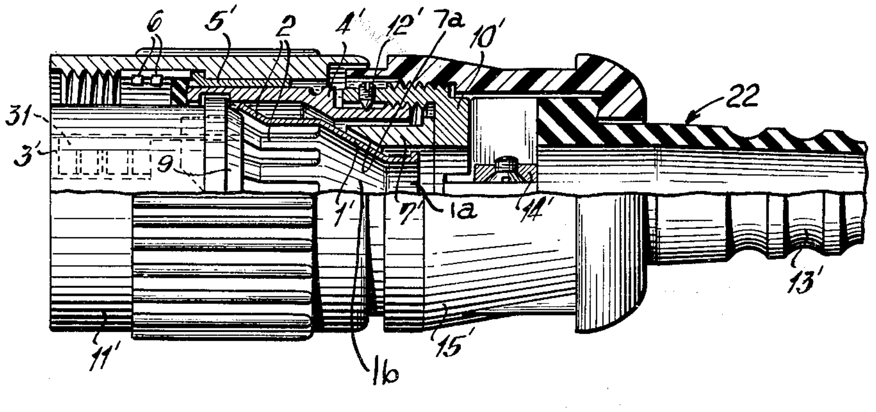
FIG. 2 is a view similar to FIG. 1 of the pin receiving portion of the coupling.

Referring to the drawings in particular, the invention embodied in FIGS. 1 and 2 includes a coupling pin portion or male element generally designated 20 and in FIG. 2 a coupling pin receiving portion or female element generally designated 22, which are closely similar and have parts which are similar and which are similarly designated but with the part of FIG. 2 designated with a prime.

The couplings 20 and 22 advantageously provide an electrical connection coupling for several wires which are surrounded or enveloped by a single shield. Single cable or line shields of ordinary construction include woven shields of windings which consist of two wire grids extending in opposite directions and which are not insulated from each other. This shield lies in the cable symmetrically to the line direction and is normally arranged to remain across the entire coupling symmetrically to the line direction. If there is an asymmetrical construction, additional currents occur in the coupling casing and the shielding will be incomplete. In order not to connect the cable shielding in point-like manner with the coupling casing or with a special contact provided for this purpose, the metal wires, after disengagement, are distributed concentrically to the core wires in a uniform manner over the entire circumference in order to prevent inductive reactances. The wires are electrically connected with the coupling casing. In the illustrated embodiment of the invention, this is constructively accomplished in such a manner that the shielding of the cables within the respective coupling halves (FIGS. 1 and 2) is taken over directly by a crown sleeve generally designated 1. The crown sleeve 1 includes a narrow cylindrical portion 1*a*, an intermediate frusto-conical portion 1*b* and a portion having longitudinally extending slots or cutouts which form circumferentially spaced elastic arms 2. The crown sleeve 1 is radially conductively connected over its entire circumference so that the shielding potential will be distributed uniformly on the circumference thereof.

The crown sleeve 1 is urged to bring the elastic arms 2 into engagement with a conical gliding ring portion 9 of a contact connecting body 3 by means of a pressure sleeve 7 having a frusto-conical end portion 7*a* which bears against the crown sleeve, and, together with a sleeve coupling casing 4 which fits over one end of the sleeve 7, surrounds the crown sleeve and the contact connecting body 3. The coupling casing 4 is advantageously made in two semi-cylindrical mating portions and is formed in a special manner in order to hold the individual parts together, being provided with suitable fitting means which have not been indicated in detail.

The contact connecting body 3 is provided in the embodiment indicated in FIG. 1 with pins 8 or sockets or contact bushings 31 of the female coupler of FIG. 2 or with other suitable contact elements having a required number of poles. The pins 8 are of a size to be received in the contact bushings 31.

The conical gliding portion 9 is formed conically and accomplishes a concentric spreading of the elastic arms of the crown sleeve 1. The spreading of the crown sleeve 1 serves to provide a secure contact with the semi-annular portions of the coupling casing 4. To insure that the spreading is sufficient and that the connection between the crown sleeve and the contact body is solid, a pressure sleeve 10 is provided to fit over one end of the pressure sleeve 7 and includes an end portion which may be threaded into an end of the coupling casing 4 and anchored in position thereover by means of a set screw 12. An end face 10*a* of the sleeve 10 bears against the pressure sleeve 7 and urges it into contact with the crown sleeve 1 to bias the latter into engagement with the conical ring 9 of the contact connecting body 3. The pressure sleeve 7 presses within the coupling casing 4 against the cone portion 1*b* of the elastic sleeve 1 and the amount of the pressure is adjustable corresponding to the movement of the pressure sleeve 10. Consequently when the sleeve 1 is advanced in the plugging-in direction, it is wedged outwardly by portion 9 and is radially brought into electrical contact with the inner wall of the coupling casing 4 and the portion 9 of the contact body 3 proper.

A feature of the construction is the provision of the elastic arms which are formed by slotting the edges of the crown sleeve 1 and bending the edges of each elastic arm 2 outwardly. The slotting serves, at the same time, for a uniform reception and securing of the shielding. The portion 1*a* of the crown sleeve 1 provides a throat portion which permits the binding and soldering of the shielding wire within this sleeve portion.

Figure 3:
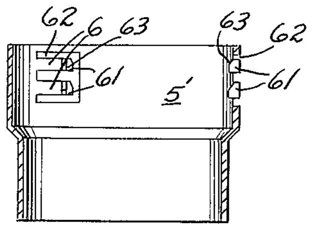
FIG. 3 is an upright longitudinal sectional view of the stepped sleeve shown on a reduced scale.

According to the invention, the semi-cylindrical portions of the coupling casing 4 are held together and enveloped during assembly and prior to screwing on of the sleeve 10 by means of a stepped sleeve 5 which is form-fittingly connected thereto. It should be noted that the male and female couplers of FIGS. 1 and 2 differ in the relative sizes of the parts at such locations, and in FIG. 2 the stepped sleeve as well as other corresponding parts are designated with a prime such as 5′ for the stepped sleeve 5. The stepped sleeve 5, surrounding the coupling housing halves 4 serve on the one hand as means for guiding the parts during their plugging together, and on the other hand they overlap the coupled joint along the entire length of the actuating movement. In FIG. 2, the stepped sleeve 5′ is provided in order to give a good contact with contact claws 6, which are arranged around the circumference of the sleeve at spaced locations and include end edges 63 (FIG. 3) which are biased against the other stepped sleeve 5 of the male coupler when it is engaged with the female coupler. These contact claws are self-wiping and make reliable contact over the entire surface.

The claws 60 are fashioned from cut-out areas 62 and are bent at their front ends so that they project into the space to be occupied by sleeve 5. The front edge of the bent end 61 is inclined at 63 so that sleeve 5′ can be pushed in to urge the claws upwardly.

The invention insures that the shielding of the cable by the crown sleeve 1 is excellent since the crown sleeve 1 comes into contact at two separate areas concentrically with the coupling casing. This is also so because the spreading of the crown sleeve 1 effected by the pressure sleeve 7 which abuts from the outside on the crown sleeve 1 by means of the pressure socket sleeve 10 which is threaded onto the coupling casing 4. The stepped sleeves 5, 5′ extend beyond the contact connecting body 3. The stepped sleeves 5, 5′ are overlapping and in conducting connection with the closing rings or nuts 11 which are threaded thereover on one end and also threadably engage a connecting sleeve or cap 15 advantageously made of insulation material. The connecting sleeve 15 is threaded onto the sleeve 10 and is provided with a central opening to accommodate the elastic cable protecting envelope 13 which includes a tension receiving member 14. The cable is clamped on member 14 and held between sleeves 10 and 15. The pressure sleeve 10 is threadable onto the coupling casing 4 by an inner thread.

Both of the coupling halves of FIGS. 1 and 2 are provided with closure rings to release the tension in the contact arrangement and wires which are preferably in the form of throw-over nuts 11 which have a narrowed outer configuration which overlie and engage the respective sleeves 15 and 5. The closure ring 11 serves the purpose of relieving the tension of the contact arrangement and securing the established overall assembly of sleeve elements together.

Instead of the embodiments indicated in the drawings, it is also possible for one of the coupling halves to be constructed as a stationary flange box which is fixed to a device or the like. From a constructional point of view, the same problems arise with regard to the movable coupling portions.

The essential advantage of the invention is that a coupling device for shielded line conduits is provided which, by broadening or modifying the simple shield of a line over the entire region of the coupling into a doubly constructed and concentrically guarded shielding of the contact elements which connect the course of the lines as well as of the wiring space, prevents the penetration or exit of interfering fields at the sensitive areas. A very important and technical advance distinct from the economical consideration is that the inventive construction creates relatively large distances in the coupling region, whereby the wiring space is easily accessible and the assembly is uncomplicated.

While specific embodiments of the invention have been shown and described in detail to illustrate the application of the inventive principles, it will be understood that the invention may be embodied otherwise without departing from such principles.

What is claimed is:

1. An electrical coupling comprising a contact connecting body having electrical connecting means at one end and means for connecting cable at its opposite end, a frusto-conical contact end portion formed at one end of said contact connecting body, a crown sleeve member including a narrow dimensioned throat section and a widened portion formed of elastic arms having out-turned ends in engagement with the frusto-conical end portion of said contact connecting body, a first pressure sleeve surrounding said crown sleeve and having an end portion in wedging engagement with the exterior thereof, a second pressure sleeve including a portion extending over said first sleeve and having an interior end portion contacting the edge of said first sleeve, a coupling casing disposed with a portion between said first sleeve and the portion of said second sleeve extending over said first sleeve, said coupling casing extending from said first sleeve beyond said contact connecting body, and a closure ring member imprisoned on and rotatable on said third sleeve and having a threaded portion for connecting the coupling.

2. An electric coupler according to claim 1, including an insulating sleeve member surrounding said second sleeve.

3. A contact connector according to claim 1, wherein said coupling casing is a stepped sleeve element.

4. A contact connector according to claim 1, wherein said closure ring is threadedly engageable with said coupling casing.

5. An electrical coupling according to claim 1, including a set screw extending from said second sleeve onto said coupling casing for anchoring the two sleeves relatively to each other.

6. An electrical connector according to claim 1, wherein at least one of said sleeves carries a contact claw on its outer circumference.

7. An electrical connector according to claim 1, wherein said closure ring has a narrowed outer surface.

8. An electrical connector according to claim 1, wherein said elastic arms outturned ends are urged outwardly into contact with said coupling casing by said first pressure sleeve.

9. A coupling device for shielded lines, particularly for high and low frequency electrical systems, characterized in that the shielding of the lines in the respective coupling halves is radially assumed, comprising a crown sleeve having a conically widened inner space and a resiliently spreadable circumferential end portion, a pressure sleeve extending over a portion of said crown sleeve and having an end surface in contact with said crown sleeve, a pressure socket member extending over said pressure sleeve and having an internal face bearing against the end face of said pressure sleeve, a coupling casing extending over said crown sleeve, a contact connecting body with a conical portion biased against the spreadable end portion of said elastic crown sleeve and terminating beyond the end of said crown sleeve over said pressure sleeve and below said socket sleeve member, a stepped sleeve extending over said coupling casing for additional radial shielding and a closure ring extending over a portion of said stepped sleeve and said coupling casing, whereby said contact connecting body is surrounded by multiple nestings of individual coupling parts by a shielding which is at least double on all sides.

10. A coupling according to claim 9, wherein said coupling casing is made of complementary half cylinder portions.

References Cited in the file of this patent

UNITED STATES PATENTS

| | | |
|---|---|---|
| 2,425,834 | Salisbury | Aug. 19, 1947 |
| 2,755,331 | Melcher | July 17, 1956 |
| 2,946,035 | Tuchel | July 19, 1960 |

FOREIGN PATENTS

| | | |
|---|---|---|
| 641,638 | Great Britain | Aug. 16, 1950 |